(12) United States Patent
Culca

(10) Patent No.: US 6,255,864 B1
(45) Date of Patent: Jul. 3, 2001

(54) METHOD AND CIRCUIT FOR MONITORING A DEFINED AMPLITUDE THRESHOLD VALUE OF SIGNALS FORMED BY ALTERNATING VOLTAGE

(75) Inventor: Horea-Stefan Culca, Siegburg (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/530,706
(22) PCT Filed: Oct. 16, 1998
(86) PCT No.: PCT/DE98/03029
  § 371 Date: May 4, 2000
  § 102(e) Date: May 4, 2000
(87) PCT Pub. No.: WO99/23498
  PCT Pub. Date: May 14, 1999

(30) Foreign Application Priority Data

Nov. 4, 1997 (DE) .............................. 197 48 633
Nov. 4, 1997 (DE) .............................. 197 48 632

(51) Int. Cl.[7] .................................................. H03K 5/153
(52) U.S. Cl. ................... 327/78; 327/72; 327/77
(58) Field of Search ................... 327/72, 74, 77, 327/78, 79; 379/399, 10

(56) References Cited

U.S. PATENT DOCUMENTS 3,836,854   9/1974   Wehman ........................... 324/133
4,245,150   1/1981   Driscoll et al. .................... 377/32
4,263,520 * 4/1981   Kajihata et al. .................... 327/72
4,399,414   8/1983   Bird ...................................... 327/37
5,019,722 * 5/1991   Hess et al. ........................... 327/78
5,570,052 * 10/1996  Fonderie et al. .................. 327/64
5,675,272 * 10/1997  Chu .................................... 327/142

FOREIGN PATENT DOCUMENTS 2671437    7/1992   (FR) .
1 254 975  11/1971  (GB) .

* cited by examiner

Primary Examiner—Toan Tran
(74) Attorney, Agent, or Firm—Kenyon & Kenyon

(57) ABSTRACT

A method for monitoring a defined amplitude threshold value of a signal formed by alternating voltage and a circuit for carrying out such a method. The method includes (a) eliminating a negative input signal half-wave (b) stepping down the residual positive input signal half-wave, (c) testing whether the value of the stepped down input signal half-wave is above or below the threshold value and generating a first binary signal according to the testing, (d) monitoring, said monitoring being carried out simultaneously to steps (a) to (c), of the zero crossing of a reference signal formed by alternating voltage and generating a second binary signal according to the monitoring, (e) generating a third signal by delaying the second signal at a defined delay time such that a state change of the third signal results at the time of the respective vertex of the positive input signal half-wave, and (f) deciding whether the value of the positive input signal half-wave is above or below the threshold value, whereby a fourth binary signal is generated by evaluating the first signal at the time of the state change of the third signal.

15 Claims, 4 Drawing Sheets

METHOD AND CIRCUIT FOR MONITORING A DEFINED AMPLITUDE THRESHOLD VALUE OF SIGNALS FORMED BY ALTERNATING VOLTAGE

FIELD OF THE INVENTION

The present invention relates to a method and a circuit for monitoring a defined amplitude threshold value of alternating voltage signals, in particular alternating voltage input signals for electronic control units such as programmable logic controls or logic relays or alternating voltage input voltage for power supplies.

RELATED TECHNOLOGY

A circuit arrangement of this type is known from U.S. Pat. No. 3,836,854. It discloses circuitry for monitoring an amplitude threshold value of an alternating voltage signal, having a rectifier, a voltage divider, and a subsequent comparator, so that when an alternating voltage input signal that exceeds a fixed threshold value, a threshold-exceeded signal appears at the comparator output. Moreover, a means of controlling the threshold-exceeded signal is present, in the form of a D flip-flop, which works together with a multivibrator circuit such that, depending on the pulse width of the threshold-exceeded signal, a determination is made to whether the signal has actually risen above or fallen below the threshold value.

A comparator arrangement is known from U.S. Pat. No. 4,399,414 that operates as a low-noise pulse conditioner, whereby interference signals are suppressed with the help of zero-crossing detection and threshold value detection of an alternating voltage signal.

Distinguishing or detecting a certain limit or threshold value is indispensable to recognizing AC signals as input signals for controls of this type. Precise and rapid detection of this defined threshold value is particularly advantageous in various applications. A generally known principle for detecting when an alternating voltage input signal goes above or below a defined threshold value is illustrated in FIG. 3, the AC input voltage is converted to a DC input voltage and its level is then measured. A circuit consisting of a half-wave or full-wave rectifier, a voltage step-down circuit (voltage divider), a filter (capacitor), and a comparator is used. A disadvantage of this solution is that the required filtering with the RC filter section in the input circuit results in long turn-on and turn-off delays. For a universal 115/230 V (50 Hz) control device, the levels are determined in accordance with standard specification EN 61131: $V_H=79V_{eff}$ and $V=40V_{eff}$. Thus, the capacitor discharge during the time between two half-waves (20 ms for half-wave rectification, 10 ms for full-wave rectification) must be smaller than $(V_{H\_VL)eff}*\sqrt{2}=55$ V. Due to the discharging time constant required for this, $t=R*C$, when the input switches from high signal to low signal at the maximum input voltage (U+10%) of $1.1*240V*\sqrt{2}=373V$, it takes a correspondingly long time for the voltage across the capacitor to reach the lower threshold of $\sqrt{2}*40V$. The opposite method, charging of the capacitor when the input goes from low to high signal, takes a similarly long time when the input voltage is minimal. In practice, these delays are at least 50–100 ms.

Moreover, in accordance with EN 61131 (6.3.7.3) alternating voltage power supplies for programmable logic controls and similar devices are subjected to an insensitivity test in which, when the input voltage drops below a certain threshold value, the control must assume a defined state (shutting off, for example). Conversely, when the supply voltage returns, the control must reliably turn on. For this purpose, reliable detection of the monitored threshold value of the input voltage for such power supplies is imperative.

With conventional power supplies, the power supply voltage is generally read and monitored after rectification and smoothing (see FIG. 1, points a and b) and the central unit is sent a signal as soon as it goes above or below a certain threshold voltage. This method is not sufficiently effective, particularly in power supplies for miniature controls and logic relays, where the available space and cost do not permit large smoothing capacitors. When there are considerable differences in current consumption due to differing numbers of outputs that are turned on and off (generally, relay outputs with correspondingly high current consumption), the problem arises in the conventional method that beginning at a certain load, no defined cut-on and cutoff point can be guaranteed. Thus, for example, when the supply voltage is turned on, when it rises above the turn-on threshold, and when outputs are turned on, the supply voltage smoothing is degraded in such a way that the voltage passes below the threshold value once again, the outputs are then cut off, the load drops, and the smoothing improves again, whereby the voltage rises above the threshold, the outputs are turned on again, etc. This cycle repeats itself until the supply voltage is at a sufficient distance from the corresponding threshold value or a smaller load is present.

SUMMARY OF THE INVENTION

It is an object of the provide invention to present a method and a circuit that can reliably and quickly detect when an alternating voltage signal passes above or below a defined amplitude threshold value.

According to the present invention, by detecting the zero-crossing of a reference signal that is preferably of the same frequency as the alternating voltage signal (AC signal) being monitored, the peak point of the signal half-wave to be monitored is detected, it is compared to a threshold value, and a logical signal is generated when it passes above or below this threshold value. Preferably, the signals obtained by monitoring the zero-crossing produce an interrupt for a microprocessor and are further processed by the latter. The subject matter of the present invention results in threshold value detection that permits a reliable determination concerning the amplitude of the AC signal that is to be monitored within a very short time. Here, the acquisition time is dependent only on the period, T, of the AC signal, whereby with half-wave rectification the acquisition time is equal to the period, T, and with full-wave rectification the acquisition time is equal to half the period, T/2.

Thus, when the subject matter of the present invention is used to monitor AC input signals to electronic devices, such as programmable logic controls, reading undesired signal states, such as "logical zero" caused by voltage loss, can be avoided, since early recognition of voltage loss produces a signal that is further processed so as to prevent reading of the signal input.

Moreover, in another application of the present invention, direct monitoring of the alternating supply voltage for power supplies guarantees reliable monitoring and defined turn-on and turn-off of the power supply voltage, regardless of the load on the output side.

BRIEF DESCRIPTION OF THE DRAWINGS

The present invention is described in more detail below with reference to the drawings, which show.

DETAILED DESCRIPTION

Figure 1:
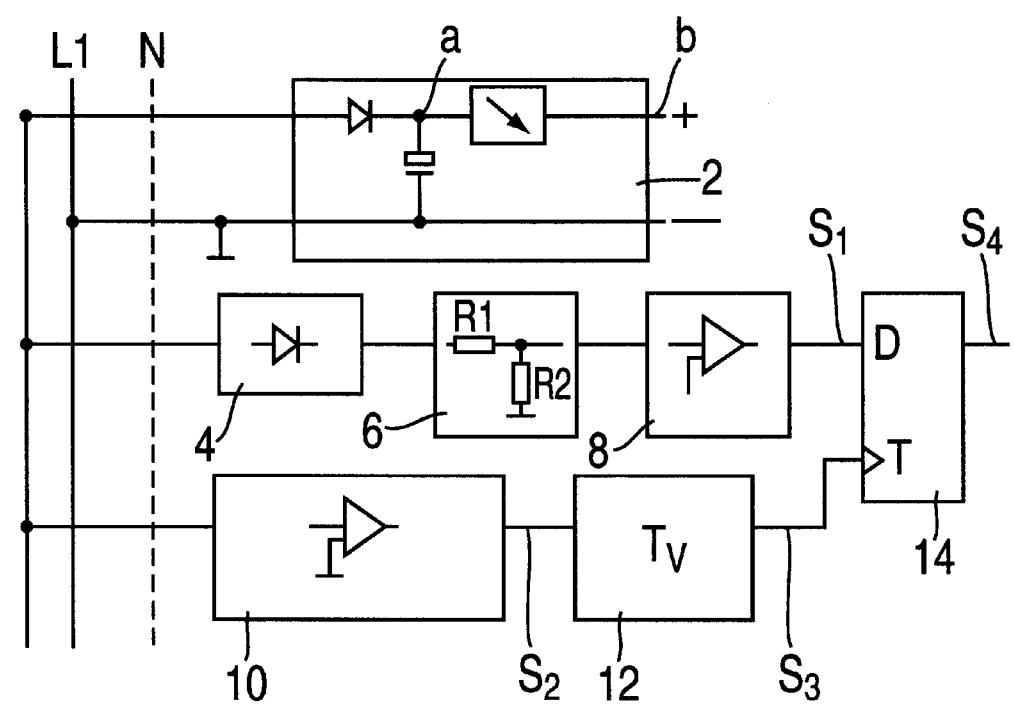
FIG. 1 shows a embodiment of a circuit for monitoring the supply voltage for a power supply.

FIG. 1 shows a power supply 2 for supplying a load and the circuit according to the present invention for monitoring a defined threshold level, L, of the supply voltage to power supply 2. The circuitry shown consists essentially of a series circuit with a rectifier 4, a voltage step-down circuit 6, and a comparator 8. In the embodiment shown, rectifier 4 is implemented in the form of a diode, whereby the supply voltage is applied to the anode of the diode (connection to L1) and its cathode feeds a voltage divider 6, consisting of resistors R1 and R2. Comparator 8 at its output, which is connected to a first input with a definable threshold value, has its second input (comparison input) connected to the junction between R1 and R2. The output from comparator 8 is connected to the level controlled input of an edge-triggered flip-flop 14.

Moreover, the circuit has a zero-crossing detector 10 and a delay stage 12. The monitoring input of zero-crossing detector 10 is connected to a reference signal (in this case, supply voltage L1). The output from zero-crossing detector 10 leads to the input of delay stage 12 which, in turn, has its output connected to the edge-triggered input of flip-flop 14.

Figure 4:
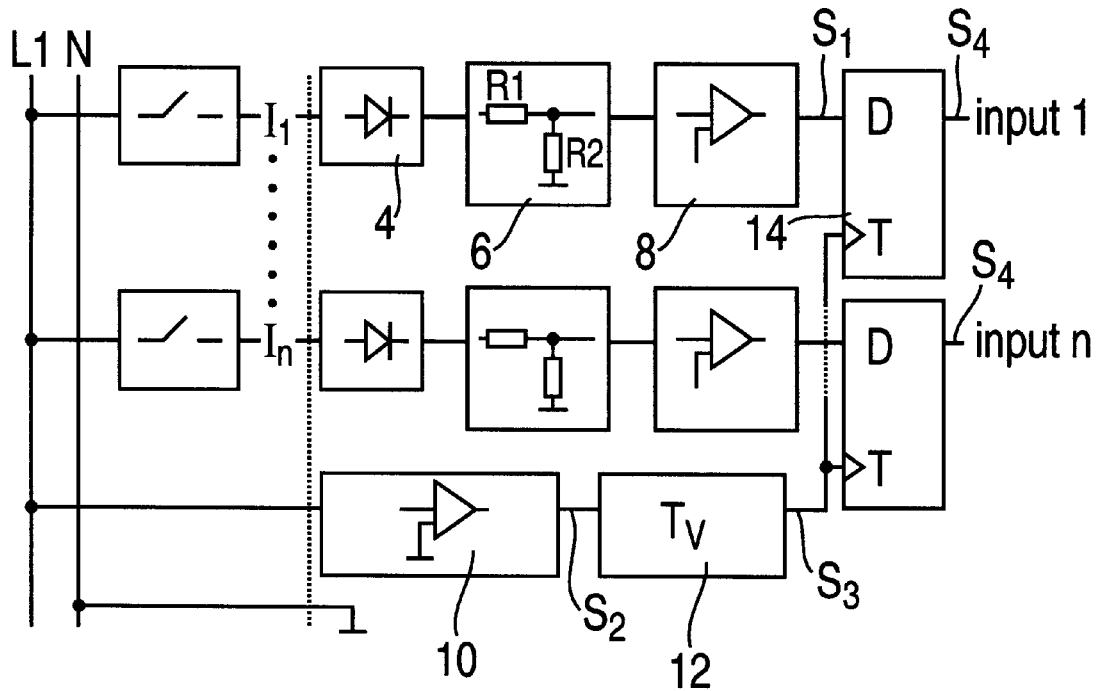
FIG. 4 shows a schematic representation of one embodiment of a circuit in accordance with the present invention for implementing the method of the present invention (here, for detecting AC input signals)

FIG. 4 shows the circuit according to the present invention for monitoring alternating voltage input signals ($I_1, \ldots, I_n$) of control units such as programmable logic controls and the like. The circuitry shown is made essentially the same as the arrangement discussed above and shown in FIG. 1. In the embodiment shown here, rectifier 4 is likewise made in the form of a diode, whereby its anode is connected to the input signal I, instead of being connected directly to the supply voltage.

Further, a method according to the present invention can be used to monitor a defined amplitude threshold of alternating voltage signals (AC signals) for electronic controls. Since, due to its nature, comparator 8 in particular cannot withstand such high negative signals, in a first step rectifier 4 eliminates the negative AC signal halfwaves. In the circuitry shown, a type HC CMOS gate is used as comparator 8. The comparison threshold value, L, is set at half the supply voltage of the CMOS gate, 5V/2=2.5V in this case. The threshold values of the equivalent AC input signals that are required in a given case are produced by the corresponding voltage-divider ratio of voltage step-down circuit 6. Thus, if the input rises above or falls below threshold value L, a first binary signal, $S_1$, is produced at the output of comparator 8, which is sent to the level-controlled input of flip-flop 14. An edge-triggered D flip-flop is used in the example shown. The output signal from comparator 8 is connected to the D-input of the D flip-flop. The edge-triggered T-input of flip-flop 14 receives the signal formed by zero-crossing detector 10 and delay stage 12 which follows it. Zero-crossing detector 10 monitors a reference signal, preferably of the same phase and frequency as the AC signal that is to be monitored, and by detecting each zero crossing it forms a second binary signal, $S_2$. Signal $S_2$ is then delayed in delay stage 12 by a delay time, $T_v$, such that at the time of the corresponding peak in the AC signal amplitude a change of state (edge signal) occurs, so that a third signal, $S_3$, is formed. The delay time, $T_v$, is preferably one fourth the period, T, of the reference signal. Flip-flop 14 is switched in accordance with the signals $S_1$ and $S_3$ at the outputs of comparator 8 and delay stage 12, forming a fourth binary signal, $S_4$. Signal $S_4$ then serves as the criterion for whether the voltage has fallen below or risen above the threshold value. Appropriate switching processes or measures can be initiated at this point using signal $S_4$. In a preferred embodiment of the circuitry, at least delay stage 12 and flip-flop 14 are implemented within the microprocessor, in the form of hardware and/or software.

Rectifier 4 and comparator 8, on the one hand, and zero-crossing detector 10, on the other, can be each implemented in a CMOS gate, whereby the integrated protective diodes of the CMOS gate are used here for a different purpose, namely to form rectifier 4, so that their function is that of rectification. This embodiment does not require rectifier 4 to be placed in series in front of voltage step-down circuit 6, as shown in FIGS. 1 and 4. In this case, rectifier 4 is connected in parallel with the resistor in voltage step-down circuit 6 that is connected to ground potential, whereby the anode of rectifier 4 is likewise connected to ground potential and its cathode is connected to the junction point between voltage step-down circuit 6 and the comparison input to subsequent comparator 8. With this embodiment, rectifier 4 is not present in the position in which it is shown in FIG. 2.

With all the embodiments of the circuitry of the present invention that are described here, additional circuitry can be used for protection against excessively high signal levels (input voltage>supply voltage of comparator 8). For this purpose, it is preferable to use an additional diode with its anode connected to the input of comparator 8 and its cathode connected to the positive power supply connection of comparator 8. In a particularly preferred embodiment, both the rectification diode (rectifier 4) and the overvoltage protection diode (not shown) are integrated into CMOS comparator 8.

The above-mentioned zero-crossing detector 10 is equivalent to the input circuit consisting of rectifier 4, voltage step-down circuit 6, and comparator 8. In contrast to this input circuit, the voltage step-down circuit with zero-crossing detector 10 is dimensioned such that the (voltage) divider ratio is virtually 1:1 and resistor R2, which is connected to ground potential, is set very large or even omitted. If the corresponding microprocessor has CMOS inputs with integrated protective diodes, it is conceivable that the separate CMOS HC inverter can be omitted and comparators 8 and zero-crossing detector 10 implemented with the integrated means in the microprocessor.

Figure 2:
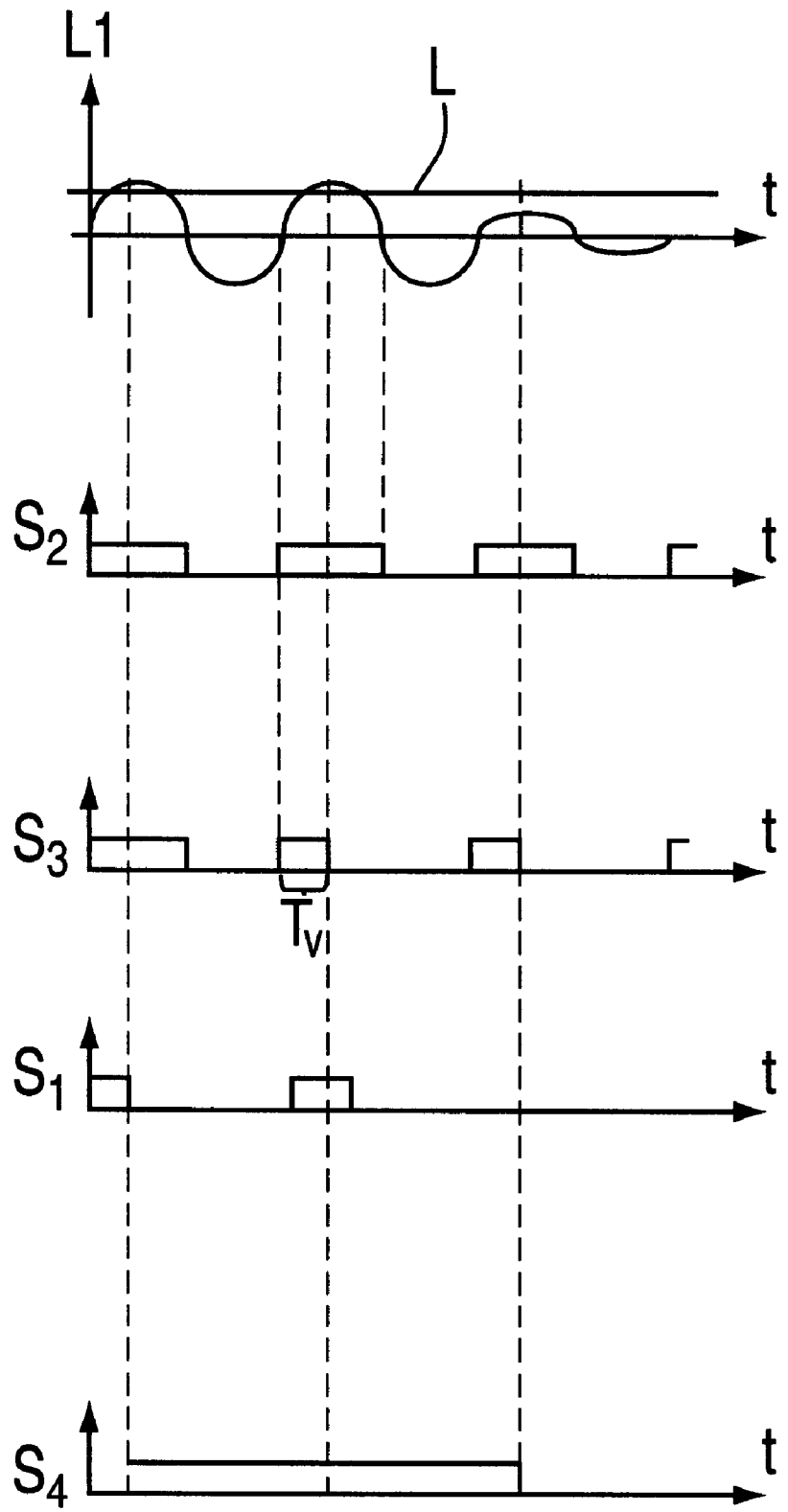
FIG. 2 shows several state diagrams of various input, intermediate, and output signals of the circuit in accordance with FIG. 1.

FIG. 2 presents the signals, $S_1$–$S_4$, formed in the circuitry in FIG. 1 as well as an AC supply voltage to be monitored for power supplies, shown in chronological order. It may be seen that above threshold value L of the supply voltage to be monitored, signal $S_1$ is produced at the output of comparator 8. At the same time, at the peak of the reference signal, signal $S_3$ forms an edge—for querying the state of the comparator output—resulting in a fourth signal, $S_4$. This signal can then be used to assure safe switching states when the supply circuit passes under or over defined threshold values and/or to signal the corresponding states (emit warnings).

Figure 5:
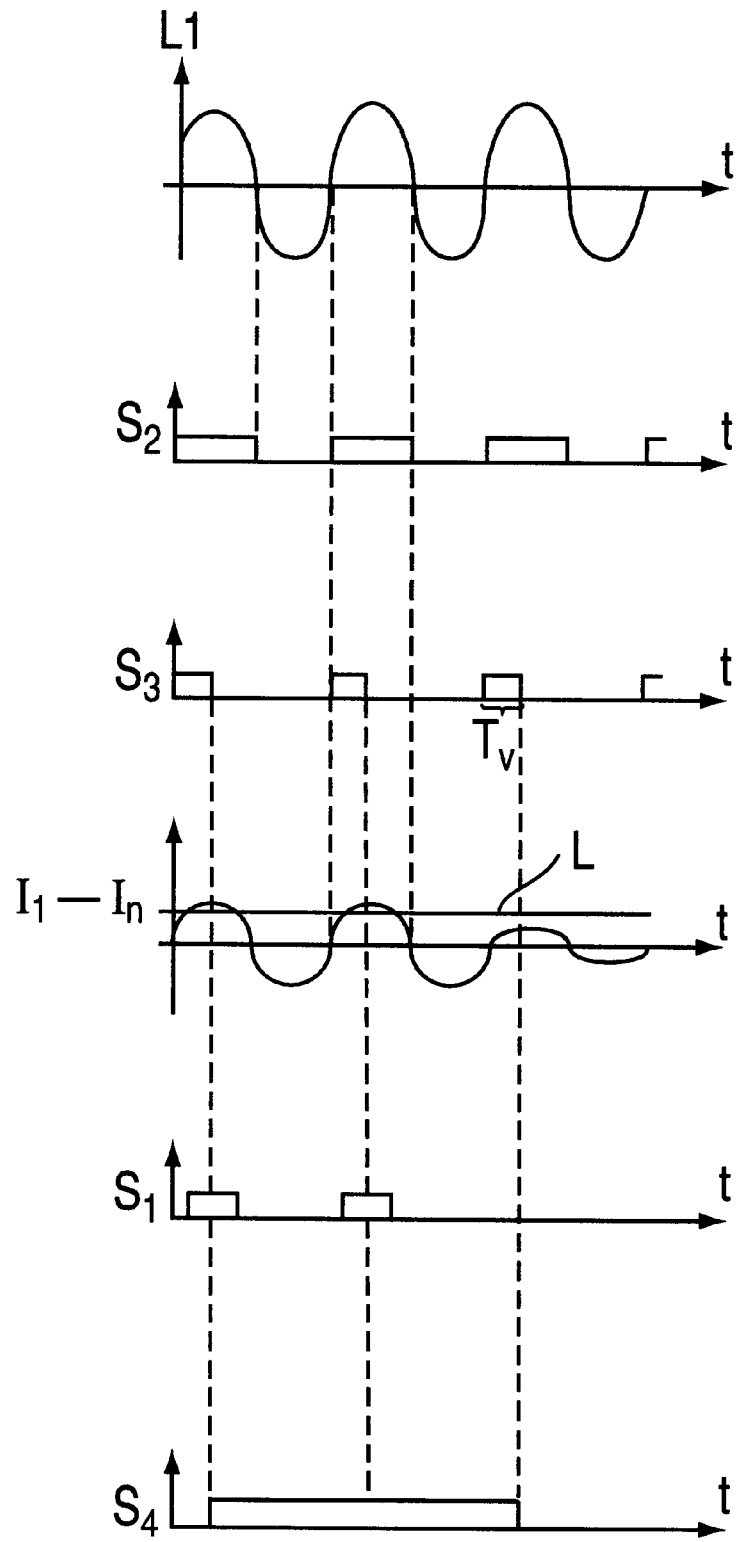
FIG. 5 shows several state diagrams of various input, intermediate, and output signals of the circuit in accordance with FIG. 4.

FIG. 5 depicts the signals, $S_1$–$S_4$, formed in the circuit in FIG. 4 and an alternating voltage input signal, I, to be monitored for a control unit, shown in chronological order. It may be seen that above threshold value L of the input signal to be monitored, signal $S_1$ is produced at the output of comparator 8. At the same time, at the peak of the reference signal, signal $S_3$ forms an edge—for querying the state of the comparator output—forming a fourth signal, $S_4$.

The present invention is not limited to the embodiments described here, but also includes all embodiments that operate within the spirit of the present invention. Thus, a circuit arrangement is possible in which the AC signals are electrically isolated by the use of optocouplers. For this purpose, comparator 8 is replaced with an optocoupler. In this case, the threshold value can be formed by the forward bias of the optocoupler's input diode. Of course, a voltage step-down circuit 6 and a rectifier must also be connected in front of the optocoupler, as described. The zero-crossing detector described above can also be implemented using an optocoupler.

What is claimed is:

1. A method for monitoring a defined amplitude threshold value of a signal formed by an alternating voltage, the method comprising:

eliminating a negative signal half-wave of the signal;

stepping down a positive signal half-waves of the signal;

testing whether a value of the stepped-down positive signal half-wave is above or below the defined amplitude threshold value and generating a first binary signal depending on a result of the testing;

monitoring for a zero crossing of an alternating voltage reference signal and generating a second binary signal depending on a result of the monitoring, the monitoring being performed simultaneously with the eliminating, the stepping down, and the testing;

delaying the second binary signal by a defined delay time so as to generate a third signal having a state change occuring at a time of a respective peak of the positive signal half-wave; and evaluating the first signal at the time of the state change of the third signal and generating a fourth binary signal depending on a result of the evaluating so as to determine whether the value of the stepped-down positive signal half-wave is above or below the defined threshold value.

2. The method as recited in claim 1 wherein the signal and the reference signal have a same frequency and a same phase and the delay time is one fourth a period of the reference signal.

3. The method as recited in claim 1 wherein the reference signal is formed by the alternating voltage that forms the signal and the delay time is one fourth the period of the reference signal.

4. A circuit arrangement for monitoring a defined amplitude threshold value of a signal formed by an alternating voltage, the circuit comprising:

a voltage step-down circuit including two resistors and a tap;

a rectifier including an anode connected to the alternating voltage and a cathode feeding the voltage step-down circuit, the voltage step-down circuit being disposed between the anode and a ground potential;

a comparator including a comparison input and an output;

the tap of the voltage step-down circuit being connected to the comparison input so as to produce a first binary signal at the comparator output;

a zero-crossing detector for forming a second binary signal, the zero-crossing detector including a monitoring input capable of being switched by a reference signal;

a delay stage connected to the zero-crossing detector for forming a time-limited third binary signal;

at least one edge-triggered flip-flop, the at least one edge-triggered flip-flop including a level-controlled input connected to the comparator output and an edge-triggered input connected to an output of the delay stage so as to generate a state-distinguishing fourth signal at the output of the at least one flip-flop.

5. A circuit arrangement for monitoring a defined amplitude threshold value (L) of a signal formed by alternating voltage, the circuit comprising:

a voltage step-down circuit arranged between the signal and a ground potential, the voltage step-down circuit including a resistor connected to the ground potential;

a comparator for producing a first binary signal at a comparator output, the comparator connected to an output of the voltage step-down circuit, a rectifier connected in parallel with the resistor of the voltage step-down circuit, the rectifier including an anode connected to the ground potential and a cathode connected to a comparison input of the comparator;

a zero-crossing detector for forming a second binary signal, the zero-crossing detector including a monitoring input connected to a reference signal;

a delay stage connected to the zero-crossing detector for generating a time-limited third binary signal;

at least one edge-triggered flip-flop including a level-controlled input of flip-flop connected to the comparator output and an edge-triggered input connected to the output of delay stage so as to produce a state-distinguishing fourth signal at the output of the at least one edge-triggered flip-flop.

6. The circuit arrangement as recited in claim 4 wherein the at least one edge-triggered flip-flop a D flip-flop.

7. The circuit arrangement as recited in claim 5 wherein the at least one edge-triggered flip-flop a D flip-flop.

8. The circuit arrangement as recited in claim 4 wherein the at least one edge-triggered flip-flop is implemented by software inside a microcontroller.

9. The circuit arrangement as recited in claim 5 wherein the at least one edge-triggered flip-flop is implemented by software inside a microcontroller.

10. The circuit arrangement as recited in claim 4 wherein the delay stage is implemented by software inside a microcontroller.

11. The circuit arrangement as recited in claim 5 wherein the delay stage is implemented by software inside a microcontroller.

12. The circuit arrangement as recited in claim 4 wherein the rectifier and the comparator are implemented in a CMOS gate, an integrated protective diode of the CMOS forming the rectifier.

13. The circuit arrangement as recited in claim 5 wherein the rectifier and the comparator are implemented in a CMOS gate, an integrated protective diode of the CMOS gate forming the rectifier.

14. The circuit arrangement as recited in claim 4 wherein the rectifier, the comparator, the zero-crossing detector, the delay stage, and the at least one edge-triggered flip-flop are implemented by software inside a microcontroller.

15. The circuit arrangement as recited in claim 5 wherein the rectifier, the comparator, the zero-crossing detector, the delay stage, and the at least one edge-triggered flip-flop are implemented by software inside a microcontroller.

* * * * *

UNITED STATES PATENT AND TRADEMARK OFFICE
CERTIFICATE OF CORRECTION

Figure 3:
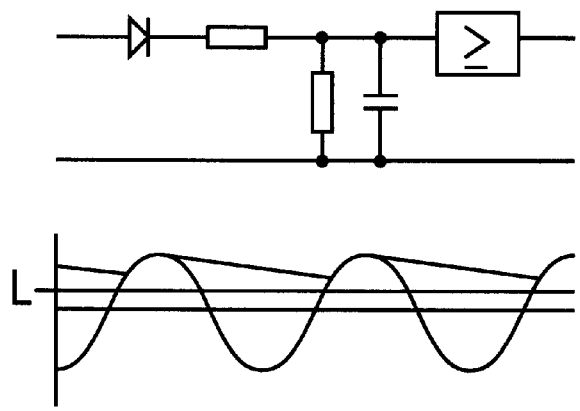
FIG. 3 shows a conventional circuit for detecting threshold values of alternating voltage input signals.

PATENT NO. : 6,255,864 B1
DATED : July 3, 2001
INVENTOR(S) : Culca, Horea-Stefan It is certified that error appears in the above-identified patent and that said Letters Patent is hereby corrected as shown below:

Column 1,
Line 25, change "made to" to -- made as to --
Line 41, change "FIG.3," to -- FIG.3; --
Line 48, change "1151230" to -- 115/23O --
Line 53, change "$(V_{H-VL})_{eff} * \sqrt{2} = 55$ V." to -- $(V_H-V_L)_{eff} * \sqrt{2} = 55$ V. --

Column 2,
Line 31, change "the provide" to -- the present --
Line 31, change "present" to -- provide --

Signed and Sealed this

Twenty-sixth Day of November, 2002

*Attest:*

*Attesting Officer*

JAMES E. ROGAN
*Director of the United States Patent and Trademark Office*